United States Patent
Kazama et al.

(10) Patent No.: US 10,397,452 B2
(45) Date of Patent: Aug. 27, 2019

(54) VEHICULAR CAMERA APPARATUS

(71) Applicant: DENSO CORPORATION, Kariya, Aichi-pref. (JP)

(72) Inventors: Takeshi Kazama, Kariya (JP); Tatsuhiko Futamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 44 days.

(21) Appl. No.: 15/653,323

(22) Filed: Jul. 18, 2017

(65) Prior Publication Data
US 2018/0027151 A1  Jan. 25, 2018

(30) Foreign Application Priority Data
Jul. 19, 2016  (JP) ................................ 2016-141399

(51) Int. Cl.
*H04N 5/225* (2006.01)
*B60R 11/04* (2006.01)
*G01D 11/24* (2006.01)
*B60R 11/00* (2006.01)

(52) U.S. Cl.
CPC .......... *H04N 5/2252* (2013.01); *B60R 11/04* (2013.01); *G01D 11/245* (2013.01); *H04N 5/2254* (2013.01); *H04N 5/2257* (2013.01); *B60R 2011/0026* (2013.01)

(58) Field of Classification Search
None
See application file for complete search history.

(56) References Cited

U.S. PATENT DOCUMENTS

| | | | | |
|---|---|---|---|---|
| 6,606,195 B2* | 8/2003 | Tsuji | ................. | G02B 27/0018 347/241 |
| 9,871,971 B2* | 1/2018 | Wang | ..................... | H04N 7/183 |
| 2009/0122138 A1 | 5/2009 | Bischoff et al. | | |
| 2011/0109969 A1* | 5/2011 | Ogasawara | ............ | G02B 7/021 359/601 |
| 2011/0267550 A1* | 11/2011 | Coleman | ................ | G02B 5/003 348/759 |
| 2014/0160284 A1 | 6/2014 | Achenbach et al. | | |
| 2014/0226012 A1 | 8/2014 | Achenbach | | |

(Continued)

FOREIGN PATENT DOCUMENTS

WO  2013123161 A1  8/2013

*Primary Examiner* — Twyler L Haskins
*Assistant Examiner* — Wesley J Chiu
(74) *Attorney, Agent, or Firm* — Knobbe, Martens, Olson & Bear, LLP (57) ABSTRACT

A vehicular camera apparatus includes a lens and a hood provided below the lens. The hood includes a rib structure and a hole structure. The rib structure is constituted of ribs that each protrude upward from a bottom wall of the hood and are arrayed in an optical axis direction of the lens. Each of the ribs has a front surface on the opposite side to the lens and a rear surface on the lens side. The front surface makes an acute angle with an imaginary plane that contains an upper surface of the bottom wall. The rear surface makes an obtuse angle with the imaginary plane. The hole structure is constituted of holes formed in the bottom wall. Each of the holes is formed along a corresponding one of the ribs and includes, at least, a projection of the front surface of the corresponding rib on the imaginary plane.

9 Claims, 5 Drawing Sheets

(56) References Cited

U.S. PATENT DOCUMENTS

| | | | |
|---|---|---|---|
| 2015/0015713 A1* | 1/2015 | Wang | H04N 7/18 |
| | | | 348/148 |
| 2016/0023620 A1* | 1/2016 | Matori | B60R 11/04 |
| | | | 348/148 |
| 2016/0167595 A1* | 6/2016 | Kang | B60R 11/04 |
| | | | 348/148 |
| 2017/0064877 A1* | 3/2017 | Ratcliffe | H05K 7/20272 |
| 2017/0182944 A1 | 6/2017 | Achenbach et al. | |
| 2017/0293199 A1* | 10/2017 | Kim | H04N 5/2252 |
| 2019/0064636 A1* | 2/2019 | Kang | G03B 17/00 |

* cited by examiner

VEHICULAR CAMERA APPARATUS

CROSS-REFERENCE TO RELATED APPLICATION

This application is based on and claims priority from Japanese Patent Application No. 2016-141399 filed on Jul. 19, 2016, the content of which is hereby incorporated by reference in its entirety into this application.

BACKGROUND

1. Technical Field

The present invention relates to camera apparatuses for use in vehicles.

2. Description of Related Art

There are known camera apparatuses that are arranged in a passenger compartment (or cabin) of a vehicle and inside a windshield of the vehicle to capture images of the environment around the vehicle. These camera apparatuses have a hood arranged below a lens and between the lens and the windshield to block extraneous light entering from the lower side. However, when extraneous light enters from the upper side, it may be reflected by a housing of the camera apparatus to enter the lens.

To solve the above problem, there is disclosed, for example in International Publication No. WO 2013/123161 A1, a vehicle vision system (or vehicular camera apparatus) which has a plurality of arrayed ridges (or ribs) each protruding upward from a bottom wall of a frame (or hood). Consequently, it is possible to trap extraneous light, which enters from the upper side, in gaps between the ridges, thereby suppressing the extraneous light from entering the lens. In addition, the ridges are formed by plastic injection molding.

However, according to the above international publication, each of side surfaces of the ridges is approximately perpendicular to or makes an obtuse angle with the bottom wall of the frame due to constraints in integrally forming the frame by plastic injection molding. Consequently, it may be difficult to sufficiently suppress entrance of extraneous light from the upper side to the lens.

SUMMARY

The present invention has been made in view of the above circumstances. It is, therefore, a primary object of the present invention to provide a vehicular camera apparatus which includes a hood capable of sufficiently suppressing entrance of extraneous light to a lens of the apparatus.

According to an exemplary embodiment, there is provided a vehicular camera apparatus that is adapted (or configured) to be fixed to a windshield of a vehicle from the passenger compartment side. The camera apparatus includes a camera module that includes a lens and an imaging element, a camera case adapted to be fixed to the windshield of the vehicle and having the camera module received therein, and a hood provided below the lens. The hood includes both a rib structure and a hole structure. The rib structure is constituted of a plurality of ribs that each protrude upward from a bottom wall of the hood and are arrayed in an optical axis direction of the lens. Each of the ribs has a front surface on the opposite side to the lens and a rear surface on the lens side. The front surface makes an acute angle with an imaginary plane that contains an upper surface of the bottom wall of the hood. The rear surface makes an obtuse angle with the imaginary plane. The hole structure is constituted of a plurality of holes that are formed in the bottom wall of the hood. Each of the holes is formed along a corresponding one of the ribs and includes, at least, a projection of the front surface of the corresponding rib on the imaginary plane that contains the upper surface of the bottom wall.

With the above configuration, the ribs of the hood are inclined forward. Consequently, when extraneous light enters any of the holes of the hood from the upper side and is reflected by, for example, the camera case, the reflected extraneous light is blocked, by the front surface of the rib that is located immediately backward of the reflection point, from entering the lens. Moreover, when extraneous light enters any of the holes of the hood from the lower side, the extraneous light is blocked, by the front surface of the rib that is located immediately backward of the hole, from further entering the lens.

In addition, the hood may be formed of resin by molding using a pair of lower and upper dies. In this case, since the ribs of the hood are inclined forward, it is impossible to pull out the lower mold to the upper side after the molten resin has hardened. Instead, the lower mold can be pulled out to the lower side while the upper mold is pulled out to the upper side. The passages through which the lower mold is pulled out to the lower side make up the holes formed in the bottom wall. That is, if the hood was configured not to include the holes, it would be impossible to form the forward-inclined ribs by the molding with the resin.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings.

DESCRIPTION OF EMBODIMENT

First, the configuration of a vehicular camera apparatus 100 according to an exemplary embodiment will be described with reference to FIGS. 1 and 2.

Figure 1:
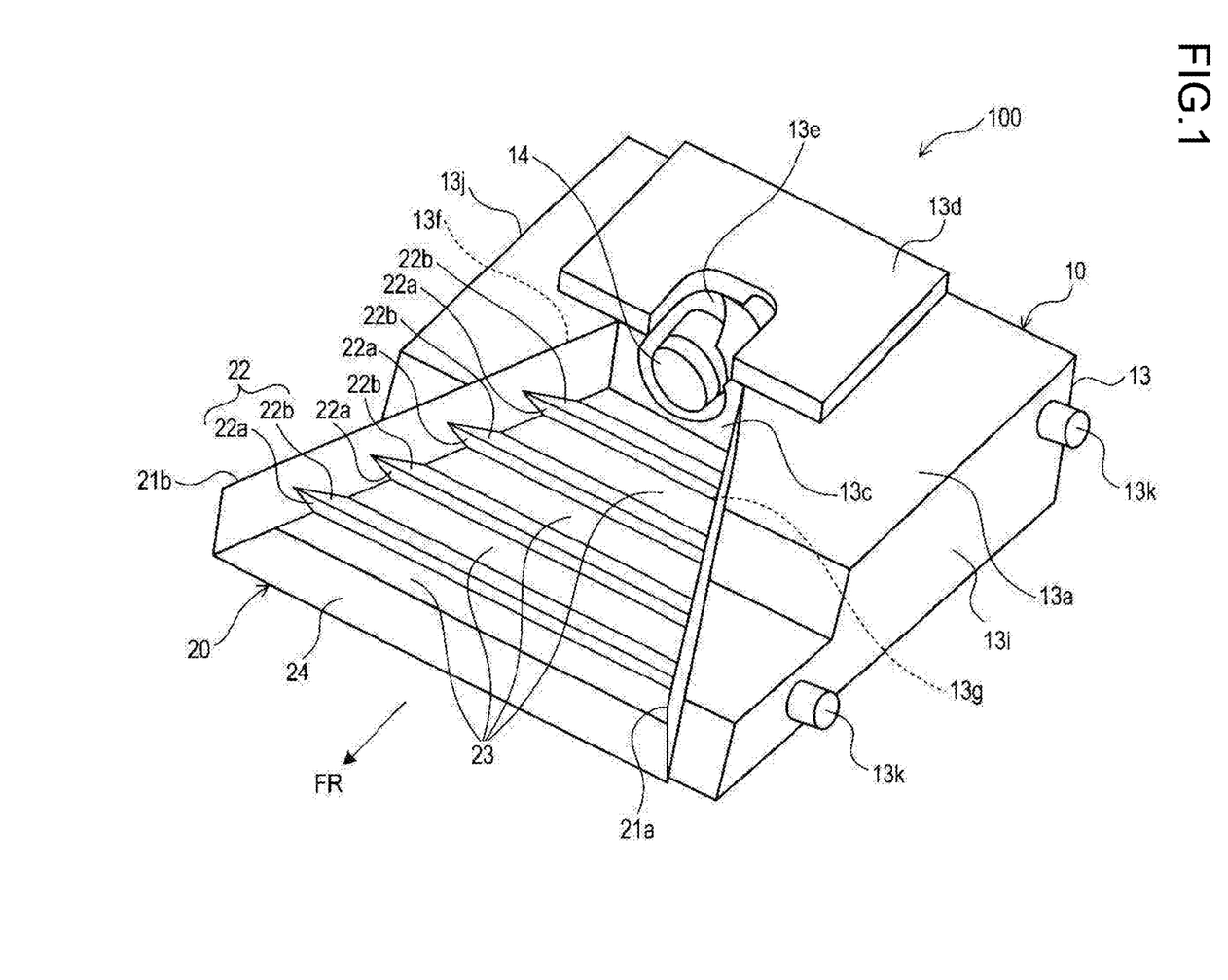
FIG. 1 is a perspective view of a vehicular camera apparatus according to an embodiment.

As shown in FIG. 1, the camera apparatus 100 includes a camera main body 10 and a hood 20. Moreover, as shown in FIG. 2, the camera apparatus 100 is located in a passenger compartment (or cabin) of a vehicle and mounted to a windshield 2 of the vehicle via a pair of brackets 3.

Figure 2:
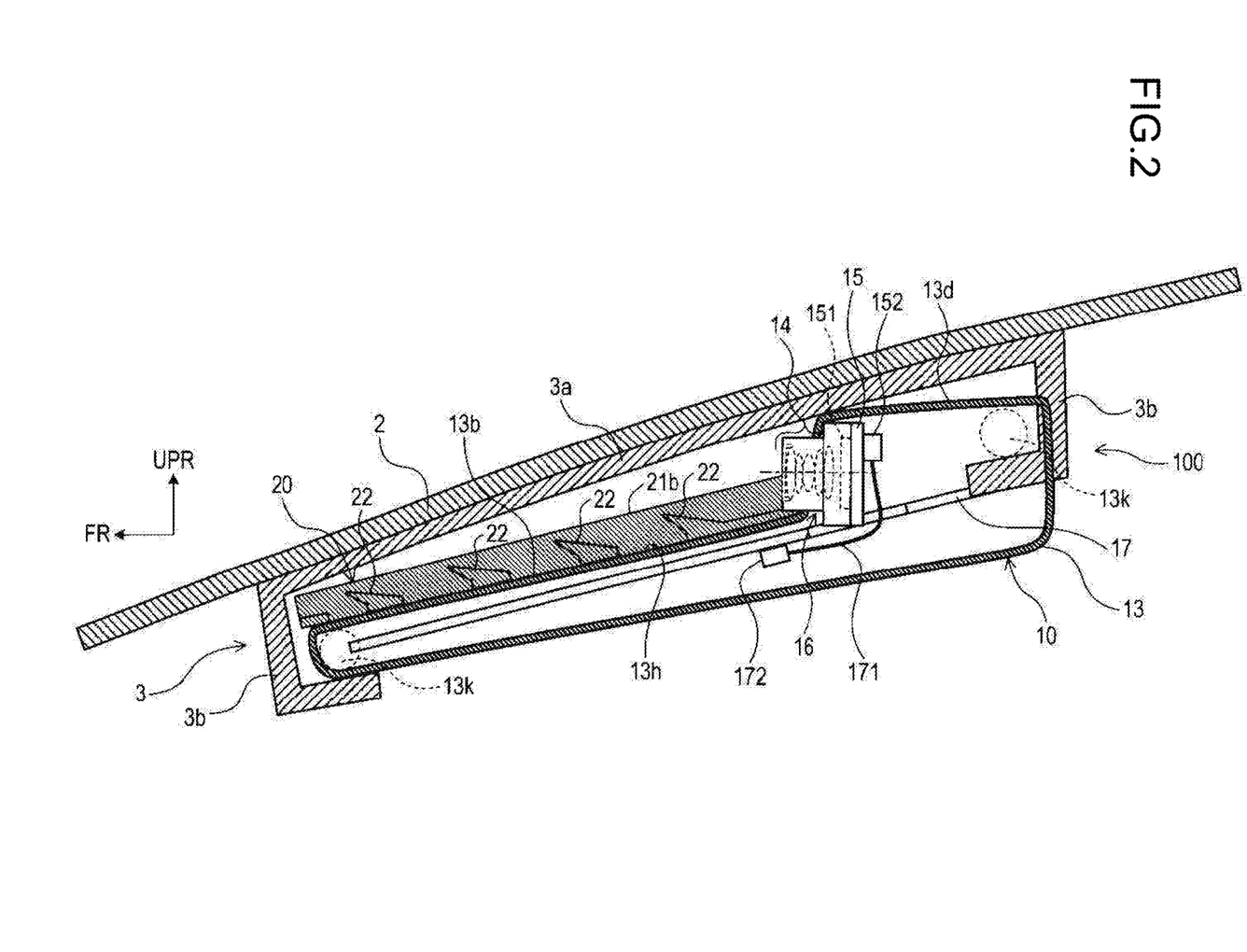
FIG. 2 is a schematic cross-sectional view illustrating the vehicular camera apparatus mounted to a windshield of a vehicle.

It should be noted that for the sake of convenience, in FIG. 2, there are shown: cross sections of the windshield 2 and one of the brackets 3 which are taken along a plane that extends through both hooks 3b of the bracket 3; and cross sections of the camera main body 10 and the hood 20 which are taken along a plane that contains an optical axis of the camera main body 10. Moreover, it also should be noted that hereinafter, for each component of the camera apparatus 100, the forward, backward, leftward, rightward, upward and downward directions denote those directions in the state where the camera apparatus 100 has been mounted to the windshield 2 as shown FIG. 2. That is, for each component of the camera apparatus 100, the forward direction with respect to the component coincides with the forward direction with respect to the vehicle. In addition, in FIGS. 1-5, FR, UPR and RH respectively designate the forward, upward and rightward directions.

The brackets 3 are made of metal or resin and adapted to be fixed to the windshield 2 of the vehicle from the passenger compartment side. Here, the term "fixed" means "located at a particular position" and encompasses "removably attached". The brackets 3 are spaced from each other in the left-right direction (or lateral direction) by a distance corresponding to the width of the camera apparatus 100 in the left-right direction. Each of the brackets 3 includes a top plate 3a adhered to the windshield 2 and a pair of substantially L-shaped hooks 3b extending downward respectively from the front and rear ends of the top plate 3b.

The camera main body 10 includes a camera module 16, a signal processing substrate 17 and a camera case 13.

The camera module 16 includes a lens 14 and a camera substrate 15.

The lens 14 is constituted of a single lens or a plurality of lenses. The lens 14 is held by a holder. The holder is made of resin or metal and includes a barrel portion and a box-shaped base portion whose bottom is opened. The lens 14 is held in the barrel portion of the holder so that the optical axis of the lens 14 (or the optical axis of the camera main body 10) coincides with a central axis of the barrel portion of the holder.

The camera substrate 15 is plate-shaped and attached to an open end of the base portion of the holder. The camera substrate 15 has an imaging element 151 and a connector 152 mounted respectively on opposite surfaces thereof. The camera substrate 15 is assembled to the holder so that that surface of the camera substrate 15 on which the imaging element 151 is mounted faces the lens 14. The imaging element 151 is implemented by a semiconductor image sensor such as a CCD (Charge-Coupled Device) image sensor or CMOS (Complementary Metal-Oxide Semiconductor) image sensor. The imaging element 151 forms an image of an object focused by the lens 14 on a photosensitive area and outputs an image signal indicative of the formed image of the object.

The signal processing substrate 17 is plate-shaped and configured to process the image signal outputted from the imaging element 151 of the camera module 16. The signal processing substrate 17 has a connector 172 mounted thereon. The connector 172 is electrically connected with the connector 152 via a connection wire 171, so that the image signal can be transmitted from the camera module 16 to the signal processing substrate 17.

The camera case 13 is formed of resin or metal into a box shape. As seen from FIG. 2, the camera case 13 is shaped so that its height decreases in the forward direction. The camera case 13 has the camera module 16 and the signal processing substrate 17 fixed therein. The camera case 13 has a recess (or pocket) 13h formed in an upper front part thereof; in the recess 13h, there is fixed the hood 20.

The camera case 13 has an upper surface 13a that includes a front flat portion 13b, a standing flat portion 13c and a rear flat portion 13d, the slopes of which are different from each other. The front flat portion 13b extends both in the front-rear direction (or longitudinal direction) and in the left-right direction (or lateral direction). The standing flat portion 13c stands upward from a rear end of the front flat portion 13b. The rear flat portion 13d extends backward from an upper end of the standing flat portion 13c.

Moreover, in the standing flat portion 13c, there is formed an exposure hole 13e through which the lens barrel of the camera module 16 (or the barrel portion of the holder in which the lens 14 is held) is exposed to the outside of the camera case 13. The exposure hole 13e is formed over a vertical range from the vertical center of the standing flat portion 13c to the vicinity of a front end of the rear flat portion 13d. The camera module 16 is fixed to the camera case 13 with the lends 14 exposed from the exposure hole 13e. The signal processing substrate 17 is fixed below the camera module 16 so as to intersect the camera substrate 15.

The front flat portion 13b has such a shape as to expand toward the field of view of the camera module 16, for example a trapezoidal shape. On the right and left sides of the front flat portion 13b, there are respectively formed interior side surfaces 13f and 13g of the camera case 13 that extend upward from the front flat portion 13b. Consequently, the recess 13h, which has a trapezoidal shape in plan view, is defined by the front flat portion 13b of the upper surface 13a, the interior side surfaces 13f and 13g and the standing flat portion 13c of the upper surface 13a. In the recess 13h, there is fitted the hood 20; thus, the front flat portion 13b of the upper surface 13a and the interior side surfaces 13f and 13g are shielded behind the hood 20.

The camera case 13 also has a pair of left and right exterior side surfaces 13i and 13j. On each of the exterior side surfaces 13i and 13j, there are formed two engaging portions 13k so as to protrude from the exterior side surface. The engaging portions 13k are located close to the upper surface 13a of the camera case 13 and cylindrical in shape. Each of the engaging portions 13k is hooked on and thereby engages with a corresponding one of the hooks 3b of the brackets 3. Consequently, with the engagement between the corresponding pairs of the engaging portions 13k of the camera case 13 and the hooks 3b of the brackets 3, the camera case 13 is fixed to the windshield 2.

The hood 20 is black in color and formed of resin. The hood 20 includes a bottom wall 24, a left side wall 21a and a right side wall 21b. The bottom wall 24 has such a shape as to expand toward the field of view of the camera module 16, for example a trapezoidal shape. The left and right side walls 21a and 21b stand (or extend upward) respectively on the left and right sides of the bottom wall 24.

The hood 20 is fitted and fixed in the recess 13h of the camera case 13. The hood 20 covers, from the lower side, the lens 14 that is exposed from the exposure hole 13e of the camera case 13, thereby blocking light that enters from the lower side of the lens 14, such as light that is reflected by a dashboard of the vehicle. Consequently, with the hood 20, it is possible to suppress scenes outside the angle of view of the camera module 16, such as the scene of the dashboard of the vehicle, from being reflected on the lens 14.

Figure 4:
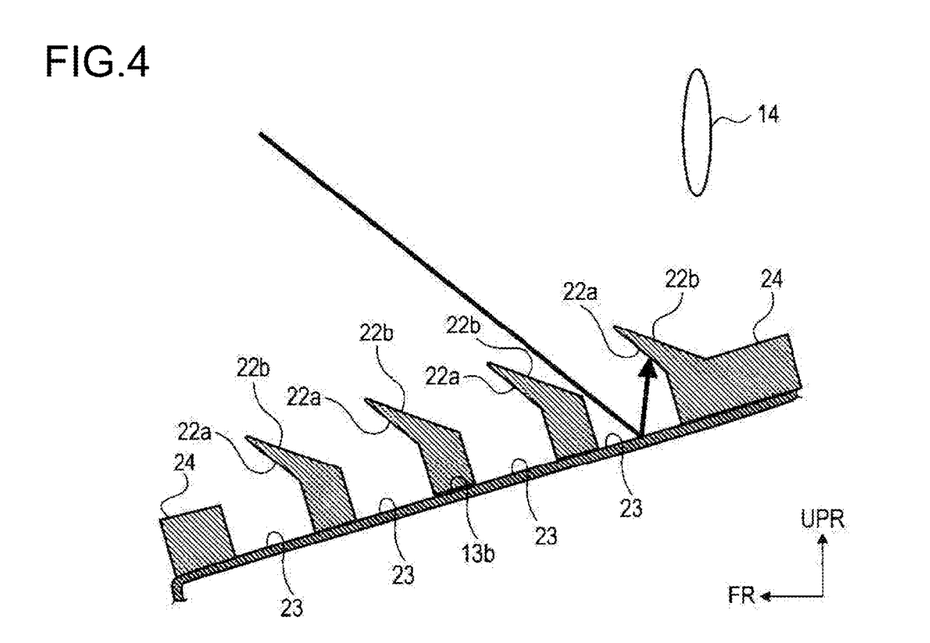
FIG. 4 is a schematic view illustrating the entrance of extraneous light from the upper side into holes formed in the hood.

FIG. 4 shows a cross section of the hood 20 taken along a plane that contains the optical axis of the lens 14. In the present embodiment, the hood 20 includes both a rib structure and a hole structure.

The rib structure is constituted of a plurality of ribs 22 that each protrude upward from the bottom wall 24 of the hood 20 and are arrayed (or arranged) in the optical axis direction of the lens 14 (or the direction of the optical axis of the lens 14). Each of the ribs 22 extends from the left side wall 21a to the right side wall 21b of the hood 20 in the left-right direction (or lateral direction). That is, for each of the ribs 22, the left and right ends of the rib 22 respectively abut the left and right side walls 21a and 21b.

Each of the ribs 22 has a front surface 22a that is on the opposite side to the lens 14 and a rear surface 22b that is on the lens 14 side. Each of the ribs 22 tapers in a direction away from the bottom wall 24 so that the distance between the front and rear surfaces 22a and 22b of the rib 22 decreases in the upward direction.

More specifically, each of the ribs 22 is shaped so that: the front surface 22a of the rib 22 makes an acute angle with an imaginary plane that contains an upper surface of the bottom wall 24; the rear surface 22b of the rib 22 makes an obtuse angle with the imaginary plane; and the front and rear surfaces 22a and 22b join at the distal end (or upper end) of the rib 22. That is, each of the ribs 22 is formed so as to be inclined from an imaginary plane perpendicular to the bottom wall 24 to the opposite side to the lens 14 (i.e., inclined forward).

Moreover, for each of the ribs 22, the dimension (or width) of the rear surface 22b of the rib 22 in the front-rear direction is greater than the dimension (or width) of the front surface 22a of the rib 22 in the front-rear direction. In addition, the distal end of the rib 22 at which the front and rear surfaces 22a and 22b join has a rounded shape.

On the other hand, the hole structure is constituted of a plurality of holes 23 that are formed in the bottom wall 24 and arranged alternately with the ribs 22 in the optical axis direction of the lens 14. Each of the holes 23 is formed over a range from the left side wall 21a to the right side wall 21b of the hood 20 in the left-right direction (or lateral direction). That is, for each of the holes 23, the left and right ends of the hole 23 are respectively defined by the left and right side walls 21a and 21b.

Each of the holes 23 is formed along a corresponding one of the ribs 22 so as to extend forward from the intersection line between the front surface 22a of the corresponding rib 22 and the bottom wall 24. For each of the holes 23, the dimension (or width) of the hole 23 in the front-rear direction is greater than the dimension (or width) of the projection of the front surface 22a of the corresponding rib 22 on the imaginary plane, which contains the upper surface of the bottom wall 24, in the front-rear direction. That is, each of the holes 23 is formed to include at least the projection of the front surface 22a of the corresponding rib 22 on the imaginary plane. In addition, in the present embodiment, for each of the holes 23, the dimension of the hole 23 in the front-rear direction is represented by the distance from the intersection line between the front surface 22a of the corresponding rib 22 and the bottom wall 24 to the intersection line between the rear surface 22b of the rib 22 that is located immediately forward of the hole 23 and the bottom wall 24.

Moreover, in the present embodiment, the vertical dimension (or height) of those portions of the bottom wall 24 each of which is formed between one adjacent pair of the holes 23 is substantially equal to the vertical dimension (or height) of the projections of the front surfaces 22a of the ribs 22 on the imaginary plane that contains the upper surface of the bottom wall 24.

Figure 3:
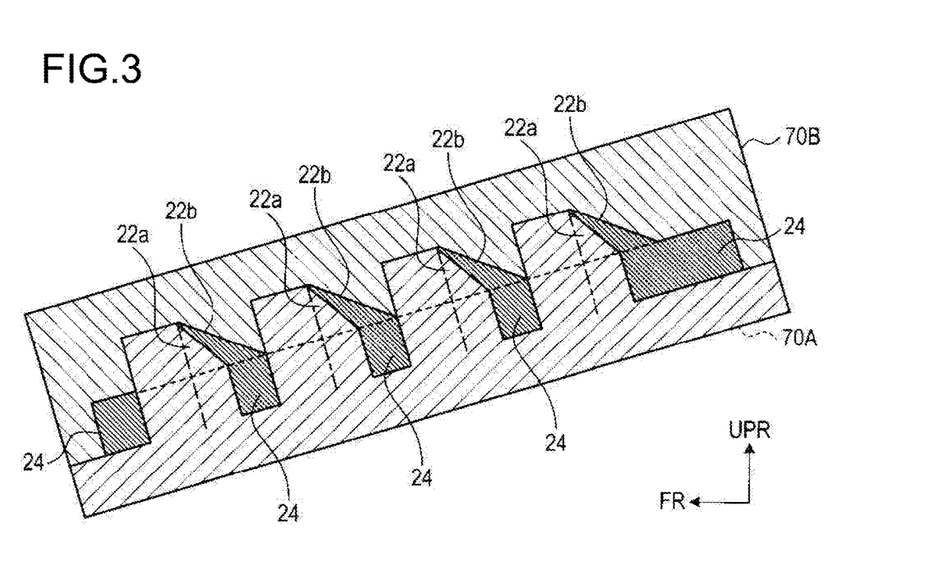
FIG. 3 is a schematic cross-sectional view illustrating a process of forming a hood of the vehicular camera apparatus using a pair of upper and lower molds.

Next, a process of forming the hood 20 according to the present embodiment will be described with reference to FIG. 3.

In the present embodiment, the hood 20 is integrally formed of resin by injection molding using a pair of lower and upper molds 70A and 70B. The lower mold 70A is configured to form the contour of the front surfaces 22a of the ribs 22, the lower-side contour of the bottom wall 24 and the contour of the holes 23. The upper mold 70B is configured to form the contour of the rear surfaces 22b of the ribs 22 and the upper-side contour of the bottom wall 24.

In the process, the lower and upper molds 70A and 70B are first assembled to each other. Then, molten resin is injected into cavities formed between the lower and upper molds 70A and 70B. After the injected resin has hardened in the cavities, the lower and upper molds 70A and 70B are pulled out (or removed). Consequently, the hood 20 is obtained which has both the rib structure and the hole structure as described above.

In addition, when the lower and upper molds 70A and 70B are assembled together, there are areas where the lower and upper molds 70A and 70B make direct contact with each other. The molten resin cannot be injected into these areas; thus after the lower and upper molds 70A and 70B are pulled out, the holes 23 are formed in these areas to penetrate the bottom wall 24 in a direction perpendicular to the bottom wall 24. The ribs 22 are formed to protrude upward respectively from those portions of the bottom wall 24 each of which is formed between one adjacent pair of the holes 23.

In the present embodiment, the ribs 22 of the hood 20 are inclined forward as described above. Therefore, it is impossible to pull out the lower mold 70A to the upper side after the molten resin has hardened. Accordingly, in the present embodiment, the lower mold 70A is pulled out to the lower side while the upper mold 70B is pulled out to the upper side. The passages through which the lower mold 70A is pulled out to the lower side make up the holes 23 formed in the bottom wall 24. That is, if the hood 20 was configured not to include the holes 23, it would be impossible to form the forward-inclined ribs 22 by the injection molding with the resin. Moreover, since the hood 20 is injection-molded using the lower and upper molds 70A and 70B, the distal ends of the resultant ribs 22 have not a sharp but a rounded shape.

Referring now to FIG. 4, the function of the hood 20 according to the present embodiment will be described.

In the present embodiment, the ribs 22 of the hood 20 are inclined forward so that for each of the ribs 22, the front surface 22a of the rib 22 makes an acute angle with the imaginary plane that contains the upper surface of the bottom wall 24. Consequently, as shown in FIG. 4, when extraneous light enters any of the holes 23 of the hood 20 from the upper side and is reflected by the front flat portion 13b of the upper surface 13a of the camera case 13, the reflected extraneous light is blocked, by the front surface 22a of the rib 22 that is located immediately backward of the reflection point, from entering the lens 14. Moreover, thought not graphically illustrated, when extraneous light leaks into any of the holes 23 of the hood 20 from the lower side, the extraneous light is blocked, by the front surface 22a of the rib 22 that is located immediately backward of the hole 23, from entering the lens 14.

Figure 5:
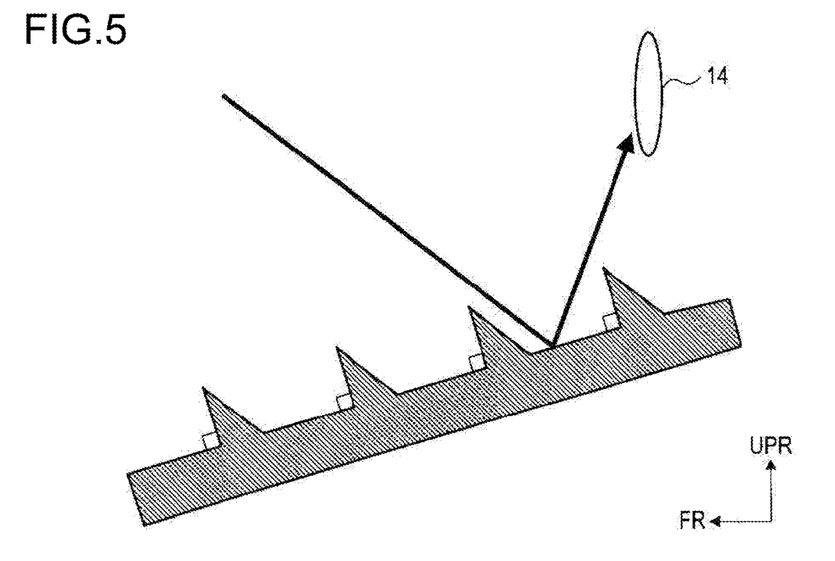
FIG. 5 is a schematic view illustrating the entrance of extraneous light from the upper side into gaps formed between ribs in a hood according to a related art.

In comparison, as shown in FIG. 5, a hood according to a related art includes ribs but no holes. The ribs each protrude upward from a bottom wall of the hood and are spaced from each other with gaps formed therebetween. For each of the ribs, the front surface of the rib makes a right or obtuse angle with the bottom wall. Consequently, as shown in FIG. 4, when extraneous light enters any of the gaps formed between the ribs from the upper side and is reflected by the bottom wall, the reflected extraneous light may enter the lens 14 without being blocked by any of the ribs depending on the incident angle of the extraneous light.

As described above, in the present embodiment, the vehicular camera apparatus 100 is fixed to the windshield 2 of the vehicle from the passenger compartment side. The camera apparatus 100 includes the camera module 16 that includes the lens 14 and the imaging element 151, the camera case 13 fixed to the windshield 2 of the vehicle and having the camera module 16 received therein, and the hood 20 provided below the lens 14 to block light that enters from the lower side of the lens 14. The hood includes both the rib structure and the hole structure. The rib structure is constituted of the ribs 22 that each protrude upward from the bottom wall 24 of the hood 20 and are arrayed (or arranged) in the optical axis direction of the lens 14. Each of the ribs 22 has the front surface 22a on the opposite side to the lens 14 and the rear surface 22b on the lens 14 side. The front surface 22a makes the acute angle with the imaginary plane that contains the upper surface of the bottom wall 24 of the hood 200. The rear surface 22b makes the obtuse angle with the imaginary plane. The hole structure is constituted of the holes 23 that are formed in the bottom wall 24 of the hood 20. Each of the holes 23 is formed along a corresponding one of the ribs 22 and includes, at least, the projection of the front surface 22a of the corresponding rib 22 on the imaginary plane that contains the upper surface of the bottom wall 24.

With the above configuration, since the hood 20 has the holes 23 formed in the bottom wall 24, it is possible to form the forward-inclined ribs 22 during the injection molding of the hood 20 using the lower and upper molds 70A and 70B. Moreover, with the forward-inclined ribs 22, it is possible to block extraneous light that enters from the upper side of the hood 20 as well as extraneous light that leaks into the holes 23 from the lower side of the hood 20, from further entering the lens 14.

In addition, in the present embodiment, for each of the ribs 22, the distal end of the rib 22 at which the front and rear surfaces 22a and 22b join has the rounded shape. This allows the ribs 22 to be formed by the injection molding using the lower and upper molds 70A and 70B.

While the above particular embodiment has been shown and described, it will be understood by those skilled in the art that various modifications, changes, and improvements may be made without departing from the spirit of the present invention.

For example, in the above embodiment, for each of the holes 23, the dimension of the hole 23 in the front-rear direction is equal to (or represented by) the distance from the intersection line between the front surface 22a of the corresponding rib 22 and the bottom wall 24 to the intersection line between the rear surface 22b of the rib 22 that is located immediately forward of the hole 23 and the bottom wall 24. However, for each of the holes 23, the dimension of the hole 23 in the front-rear direction may not be equal to the distance between the aforementioned two intersection lines provided that the dimension of the hole 23 in the front-rear direction is greater than the dimension of the projection of the front surface 22a of the corresponding rib 22 on the imaginary plane in the front-rear direction.

In the above embodiment, a plurality of functions realized by a single structural element (or component) may alternatively be realized by a plurality of structural elements; a single function realized by a single structural element may alternatively be realized by a plurality of structural elements; a plurality of functions realized by a plurality of structural elements may alternatively be realized by a single structural element; a single function realized by a plurality of structural elements may alternatively be realized by a single structural element. Moreover, part of the configuration of the vehicular camera apparatus 100 according to the above embodiment may be omitted or replaced with nay suitable alternative. In addition, the vehicular camera apparatus 100 according to the above embodiment may further include additional components or have additional functions.

In the above embodiment, the present invention is directed to the vehicular camera apparatus 100. However, the present invention may also be directed to a hood for a vehicular camera apparatus and a method of manufacturing a hood for a vehicular camera apparatus.

What is claimed is:

1. A vehicular camera apparatus to be fixed to a windshield of a vehicle from a passenger compartment side, the camera apparatus comprising:
   a camera module including a lens and an imaging element;
   a camera case to be fixed to the windshield of the vehicle, the camera case having the camera module received therein; and
   a hood provided below the lens,
   wherein
   the hood includes both a rib structure and a hole structure,
   the rib structure comprises a plurality of ribs that each protrude upward from a bottom wall of the hood and are arrayed in an optical axis direction of the lens, each of the ribs having a front surface on an opposite side to the lens and a rear surface on the lens side, the front surface making an acute angle with an imaginary plane that contains an upper surface of the bottom wall of the hood, the rear surface making an obtuse angle with the imaginary plane, and
   the hole structure comprises a plurality of holes that are formed in the bottom wall of the hood and extend through the bottom wall of the hood in a direction perpendicular to the imaginary plane, each of the holes being formed along a corresponding one of the ribs and including, at least, a projection of the front surface of the corresponding rib on the imaginary plane that contains the upper surface of the bottom wall.

2. The vehicular camera apparatus as set forth in claim 1, wherein the hood further comprises a left side wall and a right side wall that stand respectively on left and right sides of the bottom wall, and
   each of the ribs extends from the left side wall to the right side wall of the hood.

3. The vehicular camera apparatus as set forth in claim 1, wherein the hood further comprises a left side wall and a right side wall that stand respectively on left and right sides of the bottom wall, and
   each of the holes is formed over a range from the left side wall to the right side wall of the hood.

4. The vehicular camera apparatus as set forth in claim 1, wherein for each of the holes, a dimension of the hole in a front-rear direction is greater than a dimension of the projection of the front surface of the corresponding rib on the imaginary plane in the front-rear direction.

5. The vehicular camera apparatus as set forth in claim 1, wherein for each of the ribs, a dimension of the rear surface of the rib in a front-rear direction is greater than a dimension of the front surface of the rib in the front-rear direction.

6. The vehicular camera apparatus as set forth in claim 1, wherein a vertical dimension of portions of the bottom wall, each of which is formed between one adjacent pair of the holes, is substantially equal to a vertical dimension of the projections of the front surfaces of the ribs on the imaginary plane.

7. The vehicular camera apparatus as set forth in claim 1, wherein the hood is formed from resin.

8. The vehicular camera apparatus as set forth in claim 7, wherein for each of the ribs, the front and rear surfaces of the rib join at a distal end of the rib, and the distal end has a rounded shape.

9. A vehicular camera apparatus comprising:
a camera module; and
a hood mounted to the camera module,
wherein
the hood includes both a rib structure and a hole structure,
the rib structure comprises a plurality of ribs that each protrude upward from a bottom wall of the hood and are arrayed in an optical axis direction of the lens, each of the ribs having a front surface on an opposite side to the lens and a rear surface on the lens side, the front surface making an acute angle with an imaginary plane that contains an upper surface of the bottom wall of the hood, the rear surface making an obtuse angle with the imaginary plane,
the hole structure comprises a plurality of holes that are formed in the bottom wall of the hood and extend through the bottom wall of the hood in a direction perpendicular to the imaginary plane, each of the holes being formed along a corresponding one of the ribs and including, at least, a projection of the front surface of the corresponding rib on the imaginary plane that contains the upper surface of the bottom wall,
the hood is formed by molding using a lower mold and an upper mold,
the bottom wall of the hood is formed between the lower and upper molds,
the plurality of holes are formed in the bottom wall by direct contact between the lower and upper molds, and
the plurality of ribs are formed to protrude upward respectively from portions of the bottom wall each of which is formed between one adjacent pair of the holes.

* * * * *